United States Patent [19]

Mc Namara

[11] Patent Number: 6,096,817
[45] Date of Patent: Aug. 1, 2000

[54] MIXTURES OF POLYIMIDES AND ELASTOMERS

[75] Inventor: James Francis Mc Namara, Kennett Square, Pa.

[73] Assignee: E. I. du Pont de Nemours and Company, Wilmington, Del.

[21] Appl. No.: 08/883,464

[22] Filed: Jun. 26, 1997

[51] Int. Cl.[7] .............................. C08L 9/00; C08L 79/08
[52] U.S. Cl. ................. 524/406; 524/514; 525/179; 525/180; 525/183; 525/184; 525/431
[58] Field of Search ..................... 525/179, 180, 525/183, 184, 431; 524/406, 514

[56] References Cited

U.S. PATENT DOCUMENTS

| | | | |
|---|---|---|---|
| 3,684,045 | 8/1972 | Samuelson | 180/5 R |
| 3,733,918 | 5/1973 | Domaas | 74/230.17 E |
| 3,777,584 | 12/1973 | Domaas | 74/230.11 E |
| 3,861,229 | 1/1975 | Domaas | 74/230.17 E |
| 3,985,192 | 10/1976 | Samuelson et al. | 180/11 |
| 4,023,635 | 5/1977 | Teal | 74/9.64 |
| 4,069,882 | 1/1978 | Leonard et al. | 74/230.17 A |
| 4,093,039 | 6/1978 | Moore et al. | 181/227 |
| 4,258,146 | 3/1981 | Balanson et al. | |
| 4,313,728 | 2/1982 | Prasad | 474/14 |
| 4,362,524 | 12/1982 | Lob et al. | 474/88 |
| 4,395,249 | 7/1983 | Prasad et al. | 474/93 |
| 4,697,665 | 10/1987 | Robert et al. | 180/230 |
| 4,730,710 | 3/1988 | Granitz et al. | 56/11.3 |
| 5,036,939 | 8/1991 | Johnson et al. | 180/233 |
| 5,038,881 | 8/1991 | Wysocki et al. | 74/342 |
| 5,050,564 | 9/1991 | Suzuki et al. | 123/492 |
| 5,408,975 | 4/1995 | Blakeslee et al. | 123/491 |
| 5,475,054 | 12/1995 | Abe . | |
| 5,520,600 | 5/1996 | Fukomoto | 492/56 |

FOREIGN PATENT DOCUMENTS

| | | |
|---|---|---|
| 0377194 | 7/1990 | European Pat. Off. . |
| 199176 | 1/1989 | Japan . |
| 091459 | 10/1995 | Japan . |
| 829 509 | 3/1960 | United Kingdom . |

OTHER PUBLICATIONS

Patent Abstracts of Japan, vol. 095, No. 006, Jul. 31, 1995 of J07082483.

Murphy "The Additives for Plastics Handbook" p. 255.

Shu "Mechanical Properties and Morphologies of NBR Composite" *New Polymeric Materials* vol. 3 No. 4 pp. 249–260; 1992.

*Primary Examiner*—David Buttner
*Attorney, Agent, or Firm*—Inna Y. Belopolsky

[57] ABSTRACT

The invention relates to a polymeric blend having a major amount of an elastomeric material and a minor amount of at least one particulate polyimide. Additionally, the polymeric blend may further contain lubricants.

8 Claims, No Drawings

MIXTURES OF POLYIMIDES AND ELASTOMERS

FIELD OF THE INVENTION

The present invention relates to compositions containing a mixture of polyimides and elastomeric materials.

BACKGROUND OF THE INVENTION

There is a need to extend the wear characteristics imparted by polyimides to more cost effective offerings that could be produced by other manufacturing processes in different geometries. A medium can be chosen that would retain the current strengths of polyimides and enhance other properties such as elongation, noise and vibration dampening and wear resistance. Additionally, there is a need to improve certain properties of polyimides.

SUMMARY OF THE INVENTION

The present invention relates to compositions containing a mixture of polyimides in particulate form and an elastomeric material. The particulate polyimide can be either green or sintered polyimide resin or can be obtained from either sintered or green ground parts or a combination of any of the above material. Green material is unsintered. Sintering is generally carried at elevated temperature, i.e., for example, at between about 300 about 450° C. Sintered material of either type is preferred for uniformity. The polyimide is added to the elastomeric material in a known manner such as those which are currently utilized for mixing polymeric and resinous materials. The high temperature properties of the polyimides can be approached by proper elastomer selection. Similarly, the properties of polyimides can be enhanced by their admixture with elastomers.

The present invention relates to the use of an elastomeric material as a matrix for a polyimide so that the wear characteristics of the polyimide can be imparted to the elastomer. Furthermore, the present invention relates to imparting the inherent properties of elastomers, such as, for example impact resistance, vibration dampening and possible noise suppression to the polyimides.

DETAILED DESCRIPTION OF THE INVENTION

The present invention relates to compositions comprising particulate polyimides and elastomeric materials. It has been found that these compositions yield an improved wear elastomeric material. The elastomer containing the particulate polyimide may optionally contain a lubricant. The particle size of the particulate polyimide can vary from fine to course particle sizes. The polyimide can have a degree of imidization of 90% or greater.

The particulate polyimide can be ground scrap or parts from polyimide molding operations as well as particulate in the form of resin or mixtures thereof. Useful polyimides include various known polyimides or mixtures.

Typically, the particulate polyimide material is present in an amount of between about 25 and 100 parts per one hundred parts (PPH) of the elastomeric composition by weight. The amount of polyimide in the elastomeric mixture will vary with the particular elastomer or elastomers and the actual application for the elastomer/polyimide mixture.

With respect to the particle size of the particulate polyimide, a too fine particle size can cause processing problems in elastomer processing equipment. A too fine material can become airborne during processing. A too coarse particle size can reduce the level of loading of the polyimide in the composition. The desired particle size for the polyimide resin particles is generally in the range of from about 5 to about 80 microns. The ground polyimide particulate material can be measured by screen mesh and the desired particle size range is from about 40 to about 80 mesh. This mesh size range is from about 400 to about 100 microns.

Polyimide particles having a desired particle size can be prepared from polyimides having larger sizes by grinding and classifying the larger sized polyimides.

In the grinding process, polyimide parts are rough broken and ground to a size of approximately 0.25 inches in diameter. The ground material is then ground again and screened to a target level of mesh size. Particles which have a size greater than the target level can be reground.

Aromatic polyimides, such as those described in U.S. Pat. Nos. 3,179,614 and 4,622,384 can be used. Certain of those polyimides have been found to be particularly satisfactory in the present invention, namely, those having a rigid polymeric structure. Representative of such rigid polymeric materials are those prepared using aromatic diamines and anhydrides such as m-phenylene diamine (MPD); bis-4,4' (3-aminophenoxy)biphenyl; 3,4-oxydianiline (3,4-ODA); Oxydianiline (ODA); p-phenylene diamine (PPD); benzophenone-3,3',4,4'-tetracarboxylic dianhydride (BTDA); bis phenol-A-diphthalicanhydride (BPADA); pyromellitic dianhydride (PMDA); trimellitic anhydride (TMA); and 3,3',4,4'-biphenyltetracarbocyclic dianhydride (BPDA). The dianhydride and the aromatic diamine may be reacted in substantially equimolar quantities. However, excesses of dianhydride or diamine can be used to beneficially modify the properties of the final polyimide. The reaction product of the dianhydride and the aromatic diamine is a polyimide precursor resin, containing a limited amount of polyamic acid which can be thermally or chemically converted to polyimide according to known techniques.

One or more of known lubricants for polyimide compositions may be used in the compositions of this invention. Illustrative lubricants include for example graphite, molybdenum disulfide or PTFE (polytetrafluoroethylene). Non-fibrillating tetrafluoroethylene polymers and copolymers such as tetrafluoroethylene/hexafluoro-propylene are also useful and are commercially available in micropowder form. E.I. Du Pont de Nemours and Company sells such materials under its trademark, Teflon® MP. Preparation of copolymers of tetrafluoroethylene is described in Morgan U.S. Pat. No. 4,879,362.

By the term elastomer or elastomeric material, what is meant is a material, such as a rubber or plastic, which at room temperature can be stretched under low stress, preferably, to at least twice its original length and, upon immediate release of the stress, will return with force to its approximate original length. The elastomers useful in this invention include, for example natural or synthetic materials. Typical materials include carboxylated and hydrogenated nitriles, neoprenes, silicones, flouropolymers, polyisoprenes, polyurethanes, acrylonitrile/butadiene copolymers, styrene/butadiene copolymers and mixtures thereof. The selection of the particular elastomers for use in the practice of the invention will be a function of the application and the environment which it is applied.

The present invention is further illustrated by the following Examples in which parts and percentages are by weight unless otherwise indicated.

EXAMPLES

Definitions

Falex No. 1 Ring & Block Wear & Friction Tester. This equipment is described in ASTM Test Method D2714. The test consists of mounting the polymeric sample against a rotating metal ring and rotating it at a constant speed with a consistent applied load for a standard time length (normally 24 hrs.). Wear rate is the amount of material eroded per unit time.

PV (units psi.fpm or MPa-m/sec)

P=applied load in psi or MPa, V=velocity in fpm or m/sec.

COF is the observed Coefficient of Friction.

SP-1: Pure polyimide resin, shapes or parts derived from pyromellitic dianhydride (PMDA) and 4,4'-oxydianiline (ODA).

SP-21: Polyimide resin, shapes, or parts derived from PMDA and ODA, and containing about 15% by weight of graphite.

B Resin: As made, milled, non-flowing polyimide resin having a particle size range of approximately 5 to 80 micrometers ($\mu$m).

Vespel®: polyimides, parts and shapes as manufactured by E.I. DuPont de Nemours and Company.

D Resin: Flowable polyimide resin having an average particle size of approximately 250 $\mu$m, made from B resin by compacting, milling, and screening to size.

Examples of Formulations With the Scope of the Invention Are Shown Hereinbelow

|  | PARTS |
| --- | --- |
| Nx 775 (Carboxylated Nitrile Elastomer) | 100 |
| Stearic Acid (Activator/Lubricant) | 1 |
| 617 AC Poly (Polyethylene) | 2 |
| 11AF (Carbon Black) | 50 |
| Agerite Resin D (Anti-oxidant) | 2 |
| Zinc Oxide (Activator) | 5 |
| DOP (Plasticizer) | 6–10 |
| Saret 517 (Monomer-CoAgent for Cure) | 10–20 |
| Varox (Peroxide Curing Agent) | 3.5 |
| Vespel ® SP21 | 50–75 |
| Totals | 229.5–268.5 |

The carboxylated nitrile mixtures within the present invention are generally variations of this basic formulation. These formulations can contain other polyimides including series 10187 (ground Vespel® instead of SP21) and series 11695 polyimide.

Data in the tables shown below indicate the physical properties and Wear test date obtained.

Effects of Addition of Polyimide on Nitrile Elastomer Properties

| SAMPLE NO. | 10187H | 10187G | 10187E | 10187F | SP21 |
| --- | --- | --- | --- | --- | --- |
| Loading(PPH) SP-21 | 0 | 80 | 80 | 100 | N/A |
| Particle size | — | Mixed | Fine | Fine | — |
| Spec. Grav | 1.31 | 1.26 | 1.26 | 1.31 | 1.42 |
| Elongation | 101 | 25 | 24 | 20 | 5.5 |
| Compression Set | 39.8 | 38.6 | 24.1 | 24.6 |  |
| Hardness-Shore A 22 hrs. @ 100C | 91 | 96 | 97 | 98 |  |

Mixed loading of 10187G was a combination of coarse and fine ground materials with particle size ranging from 40 to 60 mesh, fine was primarily 80 mesh.

Falex Wear Testing - 10187 Series

| Sample | Loading (PPH) SP-21 | PV(psi · fpm) | Wear Rate | COF |
| --- | --- | --- | --- | --- |
| 10187 H | SP-21 0 | 25,000 (0.875 MPa-m/sec) | In/Hr × 10⁻⁴ 5.00 (12.7 cm/Hr × 10⁻⁴) | 0.32 |
| E | 80/Fine | 25,000 (0.875 MPa-m/sec) 100,000 (3.5 MPa-m/sec) | 2.25 (5.72 cm/Hr × 10⁻⁴) 5.40 (13.72 cm/Hr × 10⁻⁴) | 0.27 0.175 |
| G | 80/Mixed | 25,000 (0.875 MPa-m/sec) 100,000 (3.5 MPa-m/sec) | 1.82 (4.62 cm/Hr × 10⁻⁴) 5.70 (14.48 cm/Hr × 10⁻⁴) | 0.30 0.16 |
| F | 100/Fine | 25,000 (0.875 MPa-m/sec) 50,000 (1.75 MPa-m/sec) 100,000 (3.5 MPa-m/sec) | 1.47 (3.73 cm/Hr × 10⁻⁴) 4.00 (10.1 cm/Hr × 10⁻⁴) 5.90 (14.99 cm/Hr × 10⁻⁴) | 0.30 0.25– 0.33 0.16 |

Note: With the unloaded sample 10187H, the measurements are approximate. These could not be precise since some wear debris adhered to the edge of the block. When this was removed, an unworn piece of block was torn out. The test was shutdown after 4.28 hrs. because of excessive noise. The other 25M & 100 M PV tests were run 8 hrs; the 50M tests run at a later date were 24 hrs. in duration.

General Observations on the 10187 Series

Addition of polyimide to the elastomer reduces elongation to a great degree, thus the addition provides stiffness to the elastomer.

Hardness appears to increase then level off with increased loading of Polyimide.

Compression Set is improved by polyimide addition: Test is run by ASTM Method D395.

Wear testing gave mixed results but showed a definite positive effect by the Polyimide addition. It indicates that a larger particle may be more beneficial than a finer size.

Follow up Series 10238 used sintered SP21 Resin instead of ground Parts; the compound formulation was basically the same as 10187. It was discovered making these batches that 75 PPH of resin appears to be the practical maximum from an elastomer process standpoint.

| Falex Wear Testing - 10238 Series | | | | |
|---|---|---|---|---|
| Sample 10238 | Loading (PPH) SP-21 | PV(psi.fpm) | Wear Rate In/Hr × 10⁻⁴ | COF 0.30 |
| F | 50 | 25,000 (0.875 MPa-m/sec) | 1.900 (4.83 cm/Hr × 10⁻⁴) | 0.25 |
|   |   | 50,000 (1.75 MPa-m/sec) | 4.20 (10.67 cm/Hr × 10⁻⁴) |   |
| G | 75 | 50,000 (1.75 MPa-m/sec) | 5.22 (13.26 cm/Hr × 10⁻⁴) | 0.25 |

Falex Wear Testing - 11695 Series
Evaluation of Major Variables
Series I - Effect of level of polyimide loading
All tests were run at PV of 50,000 psi-fpm (1.75 MPa-m/sec); All polyimide was sintered SP21 "B" Resin.

| Sample 11695A | Loading (PPH) SP-21 | Wear Rate In/Hr × 10⁻⁴ | COF | Hardness Shore D |
|---|---|---|---|---|
| B | 25 | 4.865 (12.36 cm/Hr × 10⁻⁴) | 0.330 | 62 |
| C | 50 | 5.275 (13.4 cm/Hr × 10⁻⁴) | 0.355 | 67 |
| D | 75 | 5.650 (14.35 cm/Hr × 10⁻⁴) | 0.360 | 68 |

Series II - Effect of polyimide particle size
All tests were run at PV of 50,000 psi-fpm(1.75 MPa-m/sec; Polyimide was sintered SP21 "B" Resin unless noted. Level of polyimide loading was at 50 PPH.

| Sample 11695A | Wear Rate In/Hr × 10⁻⁴ | COF | Hardness Shore D | Remarks |
|---|---|---|---|---|
| C | 5.275 (13.4 cm/Hr × 10⁻⁴) | 0.355 | 67 | Base line |
| E | 5.010 (12.73 cm/Hr × 10⁻⁴) | 0.345 | 62 | Oil added to. alter hardness |
| F | 4.135 (10.5 cm/Hr × 10⁻⁴) | 0.315 | 58 | Ground Parts used as loading |
| J | 2.715 (6.9 cm/Hr × 10⁻⁴) | 0.195 | 55 | "Bulked" D resin as loading |

Series III- Importance of polyimide type
All tests were run at PV of 50,000 psi-fpm(1.75 MPa-m/sec); Polyimide loading was sintered SP1 Resin replacing SP21.

| Sample 11695A | Wear Rate In/Hr × 10⁻⁴ | COF | Hardness Shore D | Remarks |
|---|---|---|---|---|
| G | 2.955 (7.5 cm/Hr × 10⁻⁴) | 0.19 | 57 | 42.5 PPH of SP1 |
| H | 2.715 (6.9 cm/Hr × 10⁻⁴) | 0.175 | 50 | 50 PPH Total SP1 + added Graphite |

Comments

The 11695 series was compounded to evaluate as many variables as possible with minimal formulation changes and is not necessarily the optimum formulation that would be used in commerical applications.

In Series II, the larger particle size of both ground parts and the "bulked" D resin indicate a possible beneficial effect on both wear rate and COF. It also shows the use of normal elastomer additives such as oils can alter both hardness and wear properties. Bulking (the D Resin Process) increases the average particle size to 250 microns.

In Series III, the SP21 resin was replaced with SP1 at the same level of Polyimide; SP21 is SP1 with encapsulated Graphite, 42.5 PPH or SP1 is an equivalent level to 50 PPH of SP21 loading. Series III shows that the polyimide is the major contributor to wear improvement as both the wear rate and COF results were the best obtained. It was postulated that the improvement may have been because of the Graphite, this series would seem to disprove that.

While the invention has been illustrated and described in the preferred embodiments of the invention, it is to be understood that these embodiments are capable of variation and modification, and, therefore, the invention is not to be limited to the precise details set forth. The inventors avail themselves of such changes and alterations as falling within the purview of the appended claims.

What is claimed is:

1. A polymeric blend comprising a major amount of an elastomeric material selected from the group consisting of carboxylated and hydrogenated nitriles, neoprenes, silicones, fluoropolymers, polyisoprenes, acrylonitrile butadiene copolymers, styrene/butadiene copolymers, and mixtures thereof; and a minor amount of at least one particulate polyimide, wherein the polyimide is derived from an aromatic diamine and an aromatic dianhydride and has a particle size from about 100 microns to about 400 microns.

2. The polymeric blend of claim 1, further comprising a lubricant.

3. The polymeric blend of claim 1 or claim 2, wherein the at least one particulate polyimide is at least about 90% imidized.

4. The polymeric blend of claim 1 or claim 2, comprising from about 60 to about 95% by weight of the elastomeric material and about 5 to about 40% by weight of the at least one particulate polyimide.

5. The polymeric blend according to claim 2, wherein the lubricant is present in an amount of up to about 40% by weight.

6. The polymeric blend according to claim 1 or claim 2, comprising about 8 to about 24% by weight of the at least one particulate polyimide and about 76 to about 92% by weight of the elastomeric material.

7. The polymeric blend of claim 2, wherein the lubricant is graphite, molybdenum disulfide, polytetrafluoroethylene, nonfibrillating tetrafluoroethylene polymers or a tetrafluoroethylene copolymer.

8. The polymeric blend according to claim 1 or claim 2, wherein the particulate polyimide is present in an amount of between about 25 and about 100 parts per hundred of the elastomeric material by weight.

* * * * *